(12) United States Patent
Kim et al.

(10) Patent No.: US 7,783,775 B2
(45) Date of Patent: Aug. 24, 2010

(54) PROVIDING MULTIMEDIA CONTENT CONTINUOUSLY FOR MULTIPLE USERS SO AS TO ACCOMMODATE MOVEMENT TO ONE OR MORE DIFFERENT AUDIENCE LOCATIONS

(75) Inventors: Kwan-Lae Kim, Yongin-si (KR); Mun-Churl Kim, Daejeon (KR); Sung-Jin Park, Anyang-si (KR); Yun-Je Oh, Yongin-si (KR); Young-Hun Joo, Yongin-si (KR); Jeong-Yeon Lim, Daejeon (KR); Mun-Jo Kim, Daejeon (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 551 days.

(21) Appl. No.: 11/499,362

(22) Filed: Aug. 4, 2006

(65) Prior Publication Data

US 2007/0033622 A1 Feb. 8, 2007

(30) Foreign Application Priority Data

Aug. 5, 2005 (KR) ............... 10-2005-0071725

(51) Int. Cl.
*G06F 15/16* (2006.01)
*H04N 7/173* (2006.01)
(52) U.S. Cl. ............... 709/231; 709/204; 709/219; 709/227; 725/86
(58) Field of Classification Search .............. 709/231, 709/235; 725/87, 86
See application file for complete search history.

(56) References Cited

U.S. PATENT DOCUMENTS

| 6,321,252 | B1 * | 11/2001 | Bhola et al. ............. 709/204 |
| 6,973,081 | B1 * | 12/2005 | Patel .................. 370/390 |
| 7,082,142 | B1 * | 7/2006 | Begeja ................ 370/507 |
| 7,558,870 | B2 * | 7/2009 | Parker ................ 709/231 |
| 2003/0073412 | A1 * | 4/2003 | Meade, II ............. 455/70 |
| 2005/0038828 | A1 * | 2/2005 | Kaluskar et al. ........ 707/200 |
| 2005/0066037 | A1 * | 3/2005 | Song et al. ............ 709/227 |
| 2006/0041674 | A1 * | 2/2006 | Reme ................ 709/231 |
| 2006/0123131 | A1 * | 6/2006 | Almaula et al. ......... 709/231 |

\* cited by examiner

*Primary Examiner*—Joseph E Avellino
*Assistant Examiner*—Harunur Rashid
(74) *Attorney, Agent, or Firm*—Cha & Reiter, LLC

(57) ABSTRACT

Multimedia content is provided continuously for multiple users each potentially moving to a different place while enjoying it together. The system includes a network for transmitting preferably IP-format data, a first device for outputting particular multimedia content received through the network, and a second device for outputting a second multimedia content prepared for, and received upon requesting, continuous provision of the particular multimedia content through the network. A contents server delivers the particular multimedia content and the second multimedia output to the first and second devices, respectively. The second multimedia content consists of the part of the particular multimedia content remaining to be transmitted at the point of time at which the second device requested the continuous provision of the particular multimedia content.

19 Claims, 6 Drawing Sheets

PROVIDING MULTIMEDIA CONTENT CONTINUOUSLY FOR MULTIPLE USERS SO AS TO ACCOMMODATE MOVEMENT TO ONE OR MORE DIFFERENT AUDIENCE LOCATIONS

CLAIM OF PRIORITY

This application claims priority under 35 U.S.C. §119 to an application entitled "System for Providing a Multimedia Content Continuously for Multiple Users Each Moving To a Different Place When Enjoying it Together and a Method Therefor," filed in the Korean Intellectual Property Office on Aug. 5, 2005 and assigned Serial. No. 2005-71725, the contents of which are incorporated herein by reference.

BACKGROUND OF THE INVENTION

1. Field of the Invention

The present invention relates a system, and method, for providing multimedia contents, and more particularly to continuously or seamlessly connecting multimedia content, being delivered to a display device, to a mobile multimedia terminal available to a spectator when he moves to a different place where he can no longer watch the display device.

2. Description of the Related Art

FIG. 1 schematically shows a conventional system for providing multimedia contents. The system includes a contents server 11 for supplying multimedia contents, a network 12 for transmitting IP-format (Internet Protocol-format) data, and a fixed display device 13 for outputting selected multimedia content received from the contents server 11 through the network 12. The system further includes a user's terminal 14 for receiving the selected multimedia content from the contents server 11 through the network so as to afford continuous viewing in the event the user moves to a different place where he can no longer watch the fixed display device 13.

More specifically describing the operation of the conventional system, the contents server 11 first transmits selected multimedia content through the network 12 to the display device 13 (101, 102). Then, the user watches, or "consumes," the received multimedia content on the display device 13. The user's terminal 14, which may be a personal digital assistant (PDA), can control the fixed display device 13.

If the user watching the multimedia content displayed on the fixed display device 13 intends to move to a different place where he can no longer watch the fixed display device, he sends, through the user's terminal 14 to the contents server 11, a request message. The request message indicates that he wishes to watch the multimedia content through the user's terminal 14 (104, 105). For such a request, particular control information (hereinafter referred to as "context information") is required. The context information includes the identifier (ID) of the multimedia content, content consumed information indicating how much of the multimedia content has been consumed or delivered, information about the user's terminal, and the ID of the user. Based on the context information, the multimedia content is switched to the user's terminal 14 (106, 107), thereby ending transmission of the multimedia content to the fixed display device 13. The switching is such as to enable the user to watch continuously or seamlessly upon moving to different place where the fixed display device 13 is no longer viewable.

However, the transmission of the multimedia content is only designated to a single changed address. Accordingly, the conventional system cannot similarly support multiple users when they move to different places where they can no longer watch the fixed display device together.

SUMMARY OF THE INVENTION

In one aspect, the present invention provides a system for supporting multiple users in providing a multimedia content when they move to different places where they can no longer watch a fixed display device together, and a method therefor.

In another aspect, a system is provided for enabling each of the users' terminals to perform discovery of the contents server. It is performed readily through a display device presently providing the multimedia content.

In a further aspect the system enables the contents server to prepare multimedia content according to the resolution information of each of the users' terminals contained in the context information.

According to an aspect of the present invention, a system provides multimedia content continuously for multiple users each potentially moving to a different place while enjoying it together. The system includes a network for transmitting preferably IP-format data, a first device for outputting particular multimedia content received through the network, and a second device for outputting a second multimedia content prepared for, and received upon requesting, continuous provision of the particular multimedia content through the network. A contents server delivers the particular multimedia content and the second multimedia output to the first and second devices, respectively. The second multimedia content consists of the part of the particular multimedia content remaining at the particular time point when another device requests the continuous provision of the particular multimedia content.

According to another aspect of the present invention, a method provides multimedia content continuously to allow one or more of multiple co-located users to move to a different place, during presentation of the multimedia content, so that both the moving and non-moving users continuously remain an audience of said presentation. In the method, a contents server provides first multimedia content for a first multimedia output device. A second multimedia output device requests, while the first multimedia output device is receiving the first multimedia content, mobilization of the first multimedia content. The mobilization likewise occurs while said first multimedia output device is receiving said first multimedia content. Context information of said second multimedia output device is checked upon the requesting of the mobilization. The second multimedia content is prepared for delivery to the second multimedia output device according to the context information checked.

BRIEF DESCRIPTION OF THE DRAWINGS

The above and other aspects, features and advantages of the present invention will become more apparent from the following detailed description when taken in conjunction with the accompanying drawings, in which the same or similar elements are denoted by the same reference numerals throughout the several views.

DETAILED DESCRIPTION

In the discussion to follow, detailed description of well-known functions or constructions is omitted for conciseness and clarity of presentation.

Figure 1:
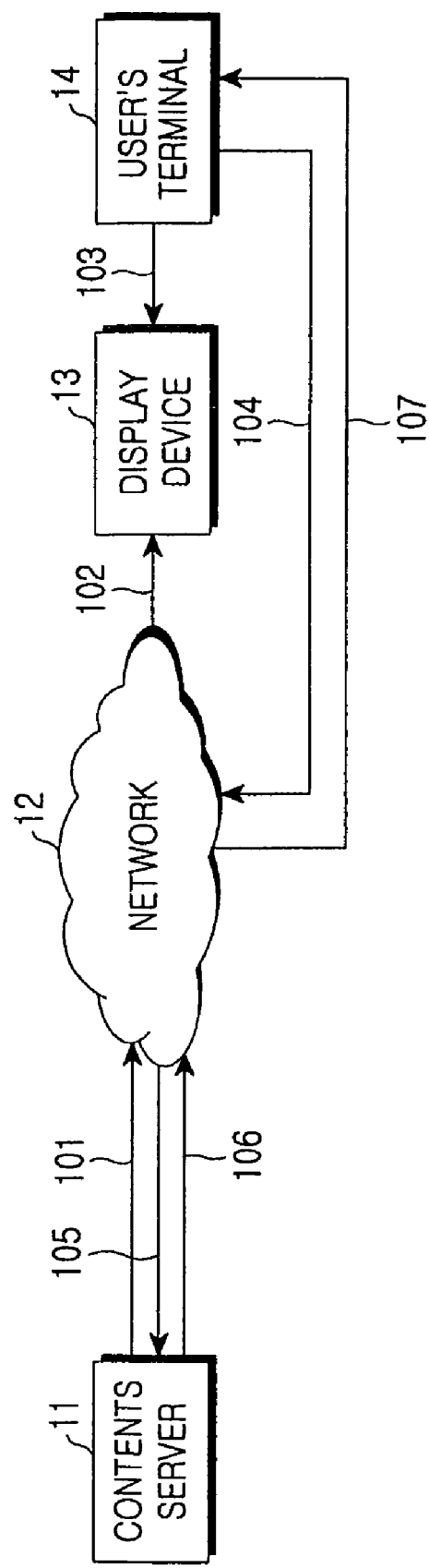
FIG. 1 is a schematic block diagram of the conventional system for providing multimedia contents.
Figure 2:
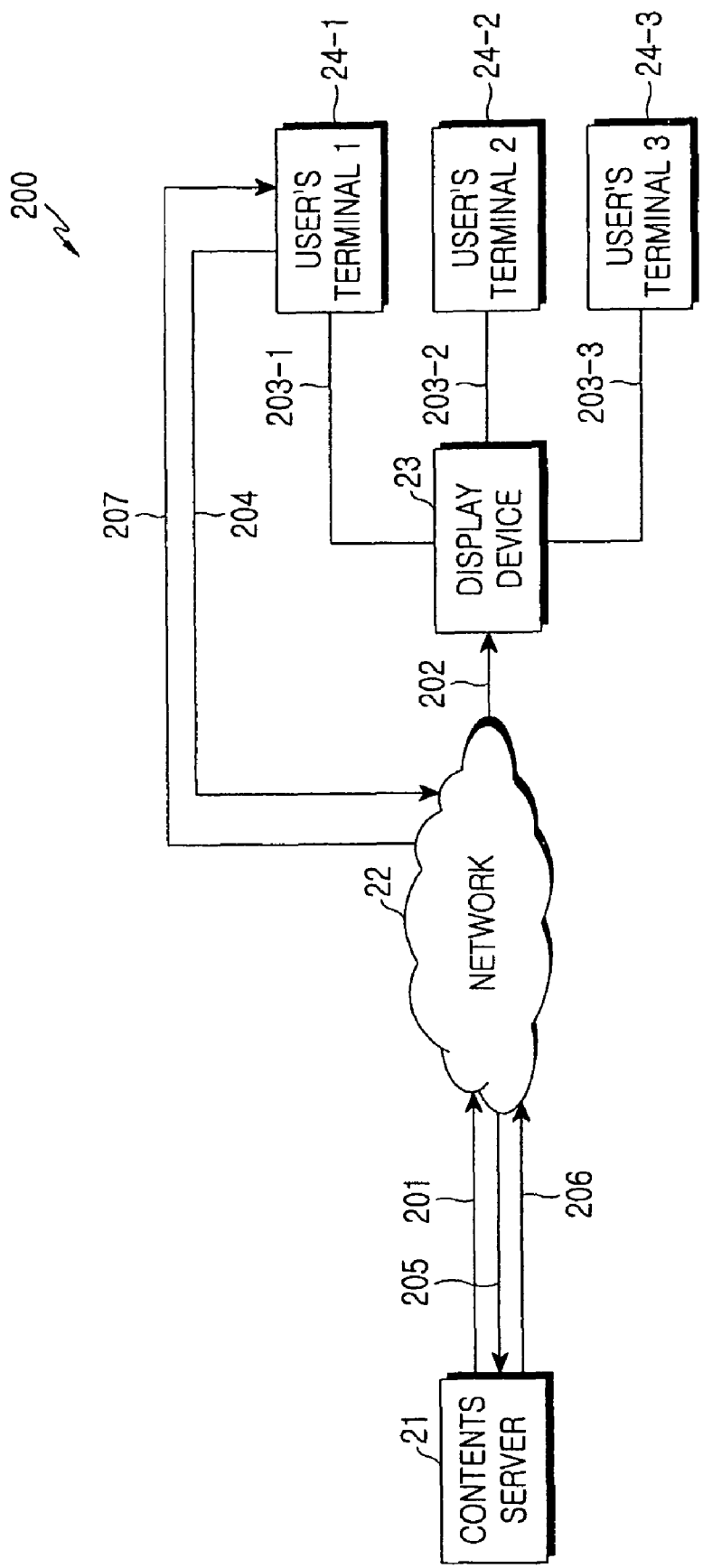
FIG. 2 is a schematic block diagram of an exemplary system for providing multimedia content to multiple users according to the present invention.

An inventive system 200, shown in FIG. 2 by way of illustrative and non-limitative example, provides multimedia content continuously for multiple users, despite user movement to different viewing locations. The system 200 includes a contents server 21 for supplying multimedia contents, a network 22 for transmitting data in IP-format, a display device 23 for outputting particular multimedia content received from the contents server 21 through the network 22, and multiple users' terminals 24-1, 24-2, 24-3 for outputting the particular multimedia content received continuously or seamlessly from the contents server 21.

The display device 23 is a fixed device connected preferably to an Internet Protocol set-top box (IP-STB) for displaying digital contents received. Examples of the IP-STB include a personal computer (PC), a liquid crystal display television (LCD TV), a plasma display panel television (PDP TV), a digital TV, and a mobile or smart phone with a display device. The users' terminals 24-1 to 24-3 are implemented as wired terminals (e.g., computers provided with network connections), or as wireless terminals examples of which are a cellular phone, Personal Communication Service (PCS) phone, personal digital assistant (PDA), International Mobile Telecommunication 2000 (IMT-2000) phone, PDA phone, and smart phone.

Operationally, the contents server 21 transmits selected multimedia content through the network 22 to the display device 23 (201, 202), preferably for current presentation at the display device. The multiple users may enjoy together the selected multimedia content outputted from the display device 23. The multiple users can control the display device 23 through their individual terminals 24-1, 24-2, 24-3 which may be PDAs (203-1, 203-2, 203-3).

A user who intends to move to a different place, i.e., from where he can no longer watch the display device 23, sends a request message to the contents server 21 requesting delivery of the selected multimedia content to the user's terminal (204, 205). The request message preferably contains context information, including the ID of the multimedia content, content consumed information for representing how much of the multimedia content has been consumed or delivered, the information of the user's terminal, and the ID of the user. The information of the user's terminal includes, in a preferred embodiment, the IP information and the resolution information of the terminal.

Receiving the context information, the contents server 21 transforms the part of the multimedia content remaining to be presented into new multimedia content, conforming to the resolution of the user's terminal 24-1 (206, 207). Preferably, the existing connection (201, 202) to the fixed display device 23 is maintained. If another user's terminals 24-2, 24-3 requests mobilization of the multimedia content in order to receive the content at a different place, i.e., where the fixed display device can no longer be watched, the contents server 21 likewise prepares new multimedia content for delivery to that terminal, without affecting the other existing connections. Accordingly, even if multiple users are initially co-located as an audience of the presentation, movement of a user to a different location is prevented from interrupting that user's continuous status as an audience of the presentation. Nor is the continuous audience status of any other user interrupted by the movement. The inventive system thus supports content delivery that is seamless to multiple users moving to different places where they can no longer watch together a fixed display device, such as an Internet Protocol television (IPTV). The potentially differently-situated users' terminals 24-1 to 24-3 can continuously receive the multimedia content independently of each other. In particular, the contents server 21 analyzes the context information of each of the users' terminals 24-1 to 24-3 to prepare new multimedia contents for respective delivery to them.

Figure 5:
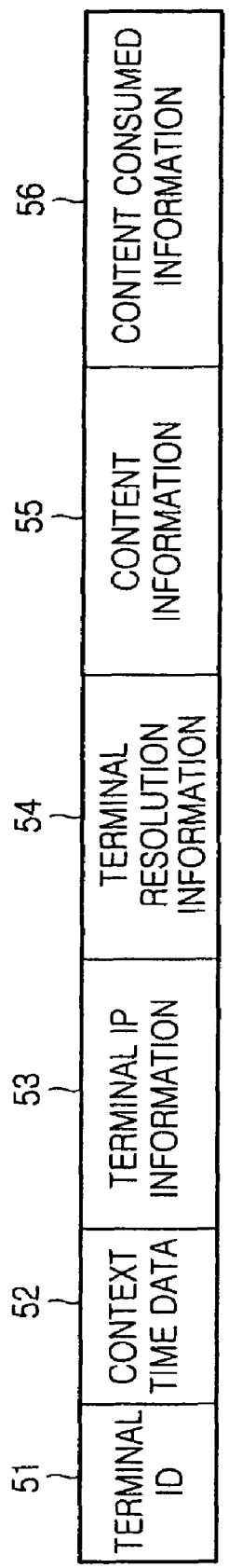
FIG. 5 is a format diagram of one example of the context information according to the present invention.

Referring to FIG. 5, the context information may, as in the example shown, be structured to include terminal ID 51 for representing the user's terminal 24-1, 24-2, 24-3, and context time data 52 for representing the point of time at which the context information is produced for subsequent transmission to the contents server 21. The context information further may include terminal IP information 53 representing the IP information of the user's terminal 24-1, 24-2, 24-3 that is to receive the multimedia content, terminal resolution information 54 representing the resolution of a display at the user's terminal and used in preparing new multimedia content fitting the resolution, content information 55 representing the particular multimedia content whose continuous provision is requested, and content consumed information 56 representing the remaining part of the particular multimedia content which is to be converted to the new multimedia content to be continuously provided.

In one embodiment, the context information includes, from among these, merely the terminal ID 51 and terminal IP information 53—the others being selectively included according to specific cases. The context time data 52, for example, may be omitted if the content consumed information is included, or vice versa. That is, how much of the multimedia content has been consumed can be calculated by using the context time data and the time when the contents server 21 began the service. More specifically, the multimedia content consumed can be discovered by subtracting the present time value from the time when the contents server 21 began the service.

Also, if the terminal resolution information 54 has been registered in the contents server 21, it need not be included in the context information. The content information 55, as a further example, may be omitted if the contents server 21 is previously provided with the list of the contents to be delivered to the location (e.g., the user's house) registered for the terminal ID 51, from which list the user can make a selection.

Figure 3:
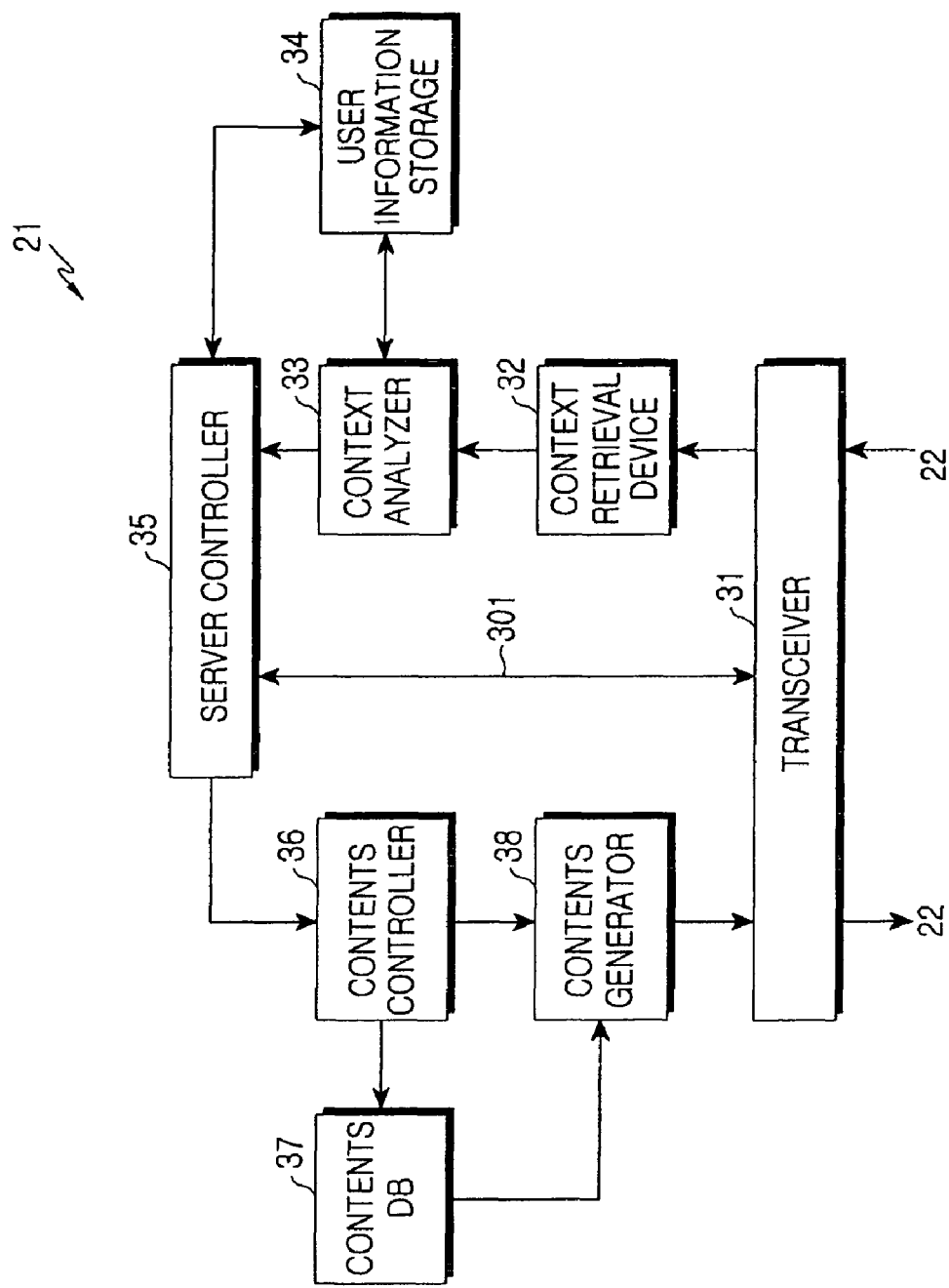
FIG. 3 is a block diagram of the structure of one realization of the contents server of a system for providing multimedia contents according to the present invention.

Referring to FIG. 3, the contents server 21, as seen from the exemplary embodiment shown, comprises a transceiver 31 for delivering the selected multimedia content to the user's terminal 24-1, 24-2, 24-3 or a fixed display device 23 according to the associated context information received through the network 22. Other components of the contents server 21 include a context retrieval device 32 for retrieving the context information from the transceiver 31, a context analyzer 33 for analyzing the context information retrieved, a server controller 35 for generating a control signal to prepare the selected multimedia content according to the context information analyzed, a contents database (DB) 37 for storing multimedia content for selective retrieval, and a contents generator 38 for preparing new multimedia content so as to fit the resolution of the user's terminal 24-1, 24-2, 24-3 by using the selected multimedia content received from the contents DB 37. Further included is a contents controller 36 for controlling the contents DB 37 to supply the selected multimedia content to the contents generator 38 according to the control signal received from the server controller 35 so as to make the contents generator 38 convert the selected multimedia content in preparing the new multimedia content.

Additionally there may be provided user information storage 34 for storing the user information, including the resolution information and authenticity information of the user's terminal used for the context analysis of the context analyzer 33. In this case, certain information such as the resolution information may be omitted from the context information.

The contents generator 38 transcodes the selected multimedia content according to the resolution information contained in the context information of the user's terminal 24-1, 24-2, 24-3, in order to conserve on transmission bandwidth and to avoid burdening the users' terminals with heavy load. For example, high definition (HD) class moving picture data, with a resolution of 1920×1080, transmitted to the users' terminals 24-1 to 24-3 without transcoding requires a much transmission bandwidth. It also causes the users' terminals 24-1 to 24-3, such as PDAs usually with a resolution of 320×240, to be subjected to heavy load in transcoding the incoming stream of data. These problems are eliminated by making the contents generator 21 transcode the multimedia content before transmission.

The fixed display device 23 and the users' terminals 24-1 to 24-3 can include prior art implementations of both a multimedia contents processor for processing multimedia content received and a context information generator for generating context information. The processor and generator are therefore not further described herein. Thus, the inventive system 200 enables the multiple users, through their respective individual terminals 24-1, 24-2, 24-3, to independently receive the multimedia content continuously as they move to different places where they can no longer watch the fixed display device 23 together.

Triggering the transition to a differently located receiving device may involve using information previously stored in the user terminal 24-1, 24-2, 24-3 which identifies the contents server 21. One type of identifier usable is a universal resource locator (URL).

Alternatively, the identifying information may reside on the fixed display device 23 or another user's terminal 24-1, 24-2, 24-3 presently outputting the multimedia content. From among these sources, the identifying information is therefore fetched as a destination to be utilized in transferring the context information to the contents server 21.

Figure 4:
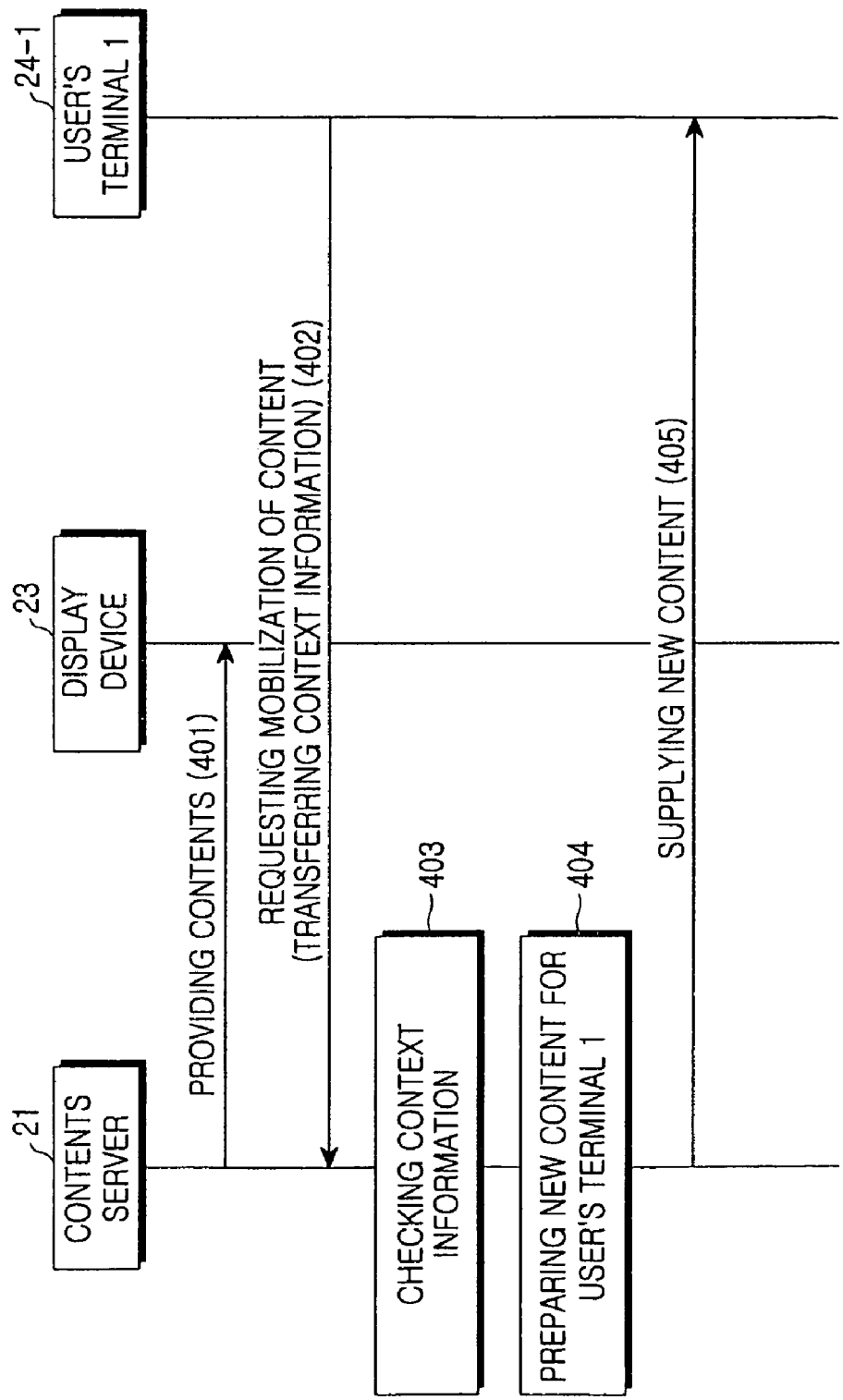
FIG. 4 is a system flow diagram illustrating a method for supporting multiple users in providing a multimedia content with mobilization according to a first embodiment of the present invention.

FIG. 4 depicts an example of a process for mobilizing the multimedia content for the multiple users according to a first embodiment of the present invention. A user's terminal 24-1 sends, in step 402, a request message to the contents server 21 requesting mobilization of the multimedia content presently being transmitted in step 401 to the fixed display device or another user's terminal. To this end, in selecting "continuous watch" from the user interface menu of the user's terminal 24-1, the context information is transferred to the contents server 21 according to the identifying information of the contents server previously stored in the user's terminal 24-1. Then the contents server 21 checks the context information in step 403 so as to prepare new multimedia content for the user's terminal 24-1.

The context information may be checked in at least two ways. One is to include the information of the user's terminal 24-1 in the context information transferred to the contents server 21. The other is for the contents server to retrieve the information of the user's terminal from the user information storage in which the information of each of the users' terminals has been stored (403). The contents server 21, in checking the context information, obtains the location and resolution of the user's terminal (IP information), the information of the multimedia content being delivered for presentation locally at the destination, and the destined presentation location for the new multimedia content in step 404, e.g., the user terminal's IP location. The new multimedia content is supplied to the user's terminal 24-1, at the presentation location, in step 405. In this case, the content reception of the former display device 23 in step 401 is not affected because the new multimedia content is prepared separately for the user's terminal 24-1, which is different from the prior art method.

Figure 6:
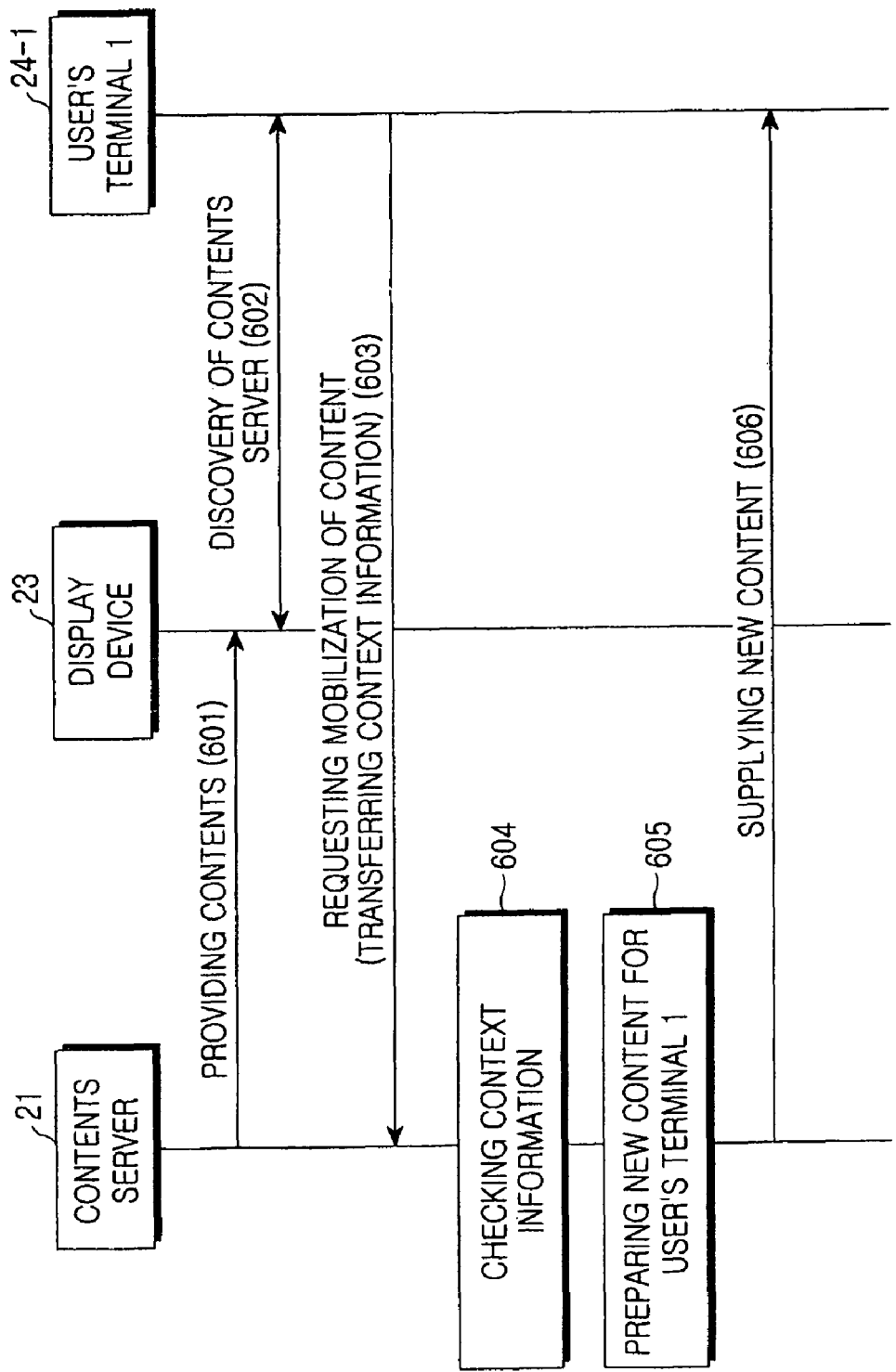
FIG. 6 is a system flow diagram illustrating a method for supporting multiple users in providing a multimedia content with mobilization according to a second embodiment of the present invention.

FIG. 6 shows a second embodiment of a mobilization process, which is similar to the first embodiment illustrated in FIG. 4, but accounts for the possibility of different content servers. If the user's terminal 24-1 requires mobilization of the multimedia content that the contents server 21 is presently supplying to the display device 23 or to another user's terminal in step 601, the user's terminal 24-1 performs server discovery through the display device 23 to discover the identifying information of the contents server 21 in step 602.

To this end, the user's terminal 24-1 may communicate with the display device 23 by employing one of various available communication means like infrared (IR) communication. The procedure of server discovery is usually not necessary for a single contents server 21 connected, but is intended for connecting with one of multiple contents servers 21. Though there are various ways, including searching, to perform the server discovery, the present embodiment employs the display device 23 to discover the identifying information of the contents server 21 connected to it. Thus discovering the identifying information, the user's terminal 24-1 sends a request message to the contents server 21 to allow the mobilization of the multimedia content in step 603.

In other words, if the user selects "continuous watch" from the user interface menu of the user's terminal 24-1, the user's terminal 24-1 performs the server discovery in step 602, and transfers the context information to the contents server 21 discovered. Then the contents server 21 checks the context information in step 604 so as to prepare new multimedia content for the user's terminal 24-1 in step 605.

The context information may be checked in at least two ways. One, as mentioned above with respect to the first embodiment, is to include the information of the user's terminal 24-1 in the context information transferred to the contents server, and the other to retrieve the information of the user's terminal from the user information storage in which the information of each of the users' terminals has been stored (604). The checking of the context information gives the location and resolution of the user's terminal (IP information), the information of the multimedia content being delivered for presentation, and the location in step 605 of the user's terminal which is to present the new multimedia content. The new multimedia content is supplied to the user's terminal 24-1 in step 606. In this case, the content reception of the former display device 23 in step 601 is not affected because the new multimedia content is prepared separately for the user's terminal 24-1, which is different from the method of the prior art.

As described above, the inventive system 200 can provide multiple users separately with the mobilization of the multimedia content. It also facilitates the discovery of the contents server 21 by obtaining the identifying information of the contents server from the display device 23 presently receiving the multimedia content. Further, the resolution information of the users' terminals 24-1, 24-2, 24-3 is included in the context information so that the contents server 21 is able to fit the multimedia content to the resolution of the destination user terminal.

While the invention has been shown and described with reference to a certain preferred embodiment thereof, it will be understood by those skilled in the art that various changes in form and details may be made therein without departing from the spirit and scope of the invention.

What is claimed is:

1. A system configured for providing multimedia content continuously for allowing a plurality of multiple co-located users to move to a different place, during presentation of the multimedia content, so that both the moving and non-moving users continuously remain as audience of said presentation, said system comprising:
    a network for transmitting data;
    a stationary display device for outputting first multimedia content to the plurality of co-located users;
    a first multimedia user terminal of a first user of a plurality of co-located users for controlling the stationary display device and for optionally receiving the first multimedia content received through said network in a separate transmission than from said stationary display device;
    a second multimedia user terminal of a second user of the plurality of co-located users for controlling the stationary display device and for requesting continuous provision of said first multimedia content through said network that is received in separate transmissions than from said stationary display device, and outputting second multimedia content corresponding to the request; and
    a contents server for delivering said second multimedia content to at least said second multimedia user terminal separately while said stationary display device is continuously delivered content controlled by said first multimedia user terminal, wherein said contents server forms said second multimedia content out of a part of said first multimedia content remaining, the remaining part being a portion remaining at a particular point of time at which the continuous provision of said first multimedia content has requested;
    wherein said plurality of co-located users comprises at least two or more users continuously receiving the same multimedia content independent of each other seamlessly after at least one co-located user of the stationary display device moves to a different location and receives the multimedia content via one of the first multimedia user terminal or the second multimedia user terminal;
    wherein said contents server comprises:
    a transceiver for delivering said first multimedia content and second multimedia content respectively to said first and second multimedia user terminals according to the context information of said first and second multimedia user terminals received;
    a context retrieval device for retrieving the received context information from said transceiver;
    a context analyzer for analyzing the context information retrieved by said context retrieval device;
    a server controller for generating a control signal;
    a contents database (DB) for storing multimedia content and for selectively supplying multimedia content the DB has stored;
    a contents generator configured for the forming of said second multimedia content delivered through said transceiver, said forming being performed, according to the analyzed context information, by use of the multimedia content selectively supplied from said contents DB; and
    a contents controller for controlling said contents DB to supply selected multimedia content to said contents generator, according to said control signal received from said server controller, so as to make said contents generator perform said forming.

2. The system of claim 1, wherein making the request for continuous provision of said first multimedia content comprises sending, by said second multimedia user terminal, context information to said contents server.

3. The system of claim 2, wherein said context information includes:
    a terminal identifier (ID) representing said second multimedia user terminal; and
    terminal Internet Protocol (IP) information representing IP information of said second multimedia user terminal for receiving said second multimedia content.

4. The system of claim 3, wherein said context information includes:
    context time data representing a point of time at which said context information was produced;
    terminal resolution information representing a resolution of a display of said second multimedia user terminal, said system being configured for using said terminal resolution information in the forming of said second multimedia content;
    content information representing said first multimedia content; and
    content consumed information representing said part of said first multimedia content.

5. The system of claim 1, wherein said contents generator transcodes the selected multimedia content according to said resolution of said display.

6. A system configured for providing multimedia content continuously for allowing a plurality of multiple co-located users to move to a different place, during presentation of the multimedia content, so that both the moving and non-moving users continuously remain as audience of said presentation, said system comprising:
    a network for transmitting data;
    a stationary display device for outputting first multimedia content to the plurality of co-located users;
    a first multimedia user terminal of a first user of a plurality of co-located users for controlling the stationary display device and for optionally receiving the first multimedia content received through said network in a separate transmission than from said stationary display device;
    a second multimedia user terminal of a second user of the plurality of co-located users for controlling the stationary display device and for requesting continuous provision of said first multimedia content through said network that is received in separate transmissions than from said stationary display device, and outputting second multimedia content corresponding to the request; and
    a contents server for delivering said second multimedia content to at least said second multimedia user terminal separately while said stationary display device is continuously delivered content controlled by said first multimedia user terminal, wherein said contents server forms said second multimedia content out of a part of said first multimedia content remaining, the remaining part being a portion remaining at a particular point of time at which the continuous provision of said first multimedia content has requested;

wherein said plurality of co-located users comprises at least two or more users continuously receiving the same multimedia content independent of each other seamlessly after at least one co-located user of the stationary display device moves to a different location and receives the multimedia content via one of the first multimedia user terminal or the second multimedia user terminal;

wherein said context information includes:

a terminal identifier (ID) representing said second multimedia user terminal; and terminal Internet Protocol (IP) information representing IP information of said second multimedia user terminal for receiving said second multimedia content; and wherein said contents server comprises:

a transceiver for delivering said first multimedia content and second multimedia content respectively to said first and second multimedia user terminals according to the context information of said first and second multimedia user terminals received;

a context retrieval device for retrieving the received context information from said transceiver;

a context analyzer for analyzing the context information retrieved by said context retrieval device;

a server controller for generating a control signal;

a contents database (DB) for storing multimedia content and for selectively supplying multimedia content the DB has stored;

a contents generator configured for the forming of said second multimedia content delivered through said transceiver, said forming being performed, according to the analyzed context information, by use of the multimedia content selectively supplied from said contents DB; and a contents controller for controlling said contents DB to supply selected multimedia content to said contents generator, according to said control signal received from said server controller, so as to make said contents generator perform said forming.

7. The system of claim 1, wherein said data to be transmitted is Internet Protocol (IP) format data.

8. The system of claim 1, wherein said portion remaining is that portion of said first multimedia content that remains to be delivered by means of said delivering.

9. The system of claim 8, said system being configured wherein said remaining part remains for presentation by said first multimedia user terminal during presentation, by said second multimedia user terminal, of said second multimedia content.

10. A method for providing multimedia content continuously to allow of a plurality of multiple co-located users to move to a different place, during presentation of the multimedia content, so that both the moving and non-moving users continuously remain an audience of said presentation, comprising the acts of:

causing a contents server to provide first multimedia content for output by a stationary display device;

causing, while the stationary display device outputs said first multimedia content, a first user terminal multimedia user terminal to request for continuous provision of said first multimedia content;

checking context information of said first user terminal multimedia user terminal upon the requesting of said continuous provision;

forming second multimedia content out of a part of said first multimedia content remaining, the remaining part being a portion remaining at a particular point of time at which the continuous provision of said first multimedia content has requested, according to the context information checked; and delivering said second multimedia content to said first user terminal multimedia user terminal while said first multimedia content is continuously delivering to said stationary display device; and wherein said plurality of co-located users comprises at least two or more users continuously receiving a same multimedia content independent of each other seamlessly after at least one user of the stationary display device moves to a different location and receives the multimedia content via one of the first multimedia user terminal or the second multimedia user terminal;

wherein said contents server comprises: a transceiver for delivering said first multimedia content and second multimedia content respectively to said first and second multimedia user terminals according to the context information of said first and second multimedia user terminals received; a context retrieval device for retrieving the received context information from said transceiver; a context analyzer for analyzing the context information retrieved by said context retrieval device; a server controller for generating a control signal; a contents database (DB) for storing multimedia content and for selectively supplying multimedia content the DB has stored;

a contents generator configured for the forming of said second multimedia content delivered through said transceiver, said forming being performed, according to the analyzed context information, by use of the multimedia content selectively supplied from said contents DB; and a contents controller for controlling said contents DB to supply selected multimedia content to said contents generator, according to said control signal received from said server controller, so as to make said contents generator perform said forming.

11. The method of claim 10, wherein said second multimedia user terminal performs server discovery with said first multimedia user terminal to discover an Internet Protocol (IP) address of said contents server, said method comprising using the discovered IP address in requesting said continuous provision of said first multimedia content.

12. The method of claim 11, wherein the act of checking the context information is performed based on information of said second multimedia user terminal included in the context information.

13. The method of claim 12, wherein the context information includes:

a terminal identifier (ID) representing said second multimedia user terminal;

terminal IP information representing IP information of said second multimedia user terminal for receiving said second multimedia content;

context time data representing a point of time at which said context information was produced;

terminal resolution information representing a resolution of a display of said second multimedia user terminal;

content information representing said first multimedia content requested; and content consumed information representing a part of said first multimedia content remaining to be provided by the contents server at a point of time at which said continuous provision was requested by the second multimedia user terminal, said method comprising using said terminal resolution information in the forming of said second multimedia content.

14. The method of claim 11, wherein the act of checking the context information is performed by retrieving, through the context information, information of said second multimedia user terminal stored in said contents server.

15. The method of claim 14, wherein the context information includes:
- a terminal ID representing said second multimedia user terminal; and
- terminal IP information representing IP information of said second multimedia user terminal for receiving said second multimedia content.

16. The method of claim 13, wherein the remaining part is that portion of said first multimedia content that remains to be provided by the contents server.

17. The method of claim 16, wherein said remaining part remains for presentation by said first multimedia user terminal during presentation, by said second multimedia user terminal, of said second multimedia content.

18. The method of claim 10, wherein the act of checking the context information is performed based on information of said second multimedia user terminal included in the context information.

19. The method of claim 10, wherein the act of checking the context information is performed by retrieving, through the context information, information of said second multimedia user terminal stored in said contents server.

* * * * *